United States Patent
Goodman (10) Patent No.: US 12,375,461 B2
(45) Date of Patent: Jul. 29, 2025

(54) AUTHENTICATING WORK ORDER REQUESTS IN A MULTIPLE NODE ENVIRONMENT

(71) Applicant: Dell Products L.P., Round Rock, TX (US)

(72) Inventor: Bradley Keith Goodman, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 358 days.

(21) Appl. No.: 18/151,158

(22) Filed: Jan. 6, 2023

(65) Prior Publication Data
US 2024/0236056 A1   Jul. 11, 2024

(51) Int. Cl.
*H04L 9/40*     (2022.01)
*H04L 67/10*    (2022.01)

(52) U.S. Cl.
CPC ...... *H04L 63/0442* (2013.01); *H04L 63/0823* (2013.01); *H04L 67/10* (2013.01)

(58) Field of Classification Search
CPC .. H04L 63/0442; H04L 63/0823; H04L 67/10
See application file for complete search history.

(56) References Cited

U.S. PATENT DOCUMENTS

| | | | |
|---|---|---|---|
| 7,549,172 B2 * | 6/2009 | Tokutani | H04L 63/101 380/258 |
| 2005/0185792 A1 * | 8/2005 | Tokutani | H04L 63/0442 380/30 |
| 2007/0055877 A1 * | 3/2007 | Persson | H04L 63/0823 713/173 |
| 2016/0365981 A1 * | 12/2016 | Medvinsky | G06F 21/57 |
| 2017/0366536 A1 | 12/2017 | Robison et al. | |
| 2021/0051029 A1 | 2/2021 | Pham et al. | |
| 2023/0163967 A1 * | 5/2023 | Cannata, Jr. | H04L 9/3263 713/156 |
| 2023/0224290 A1 * | 7/2023 | Pahl | H04L 63/0435 713/169 |

* cited by examiner

*Primary Examiner* — Yonas A Bayou
(74) *Attorney, Agent, or Firm* — Larson Newman, LLP (57) ABSTRACT

An endpoint node of a multiple node environment includes a storage and a processor. The storage stores a public key for an owner of the endpoint node and a hash list. The processor receives, from a requestor node, a request including a work order for an operation to be performed in the endpoint node. In response to reception of the request, the processor determines whether the requestor node is authorized to provide the work order for the operation to be performed. In response to the requestor node not being authorized, the processor provides a prove authentication request. The processor further receives the requested authorization data. Based on the request authorization data, the processor performs the operation in the work order of the request.

20 Claims, 3 Drawing Sheets

AUTHENTICATING WORK ORDER REQUESTS IN A MULTIPLE NODE ENVIRONMENT

FIELD OF THE DISCLOSURE

The present disclosure generally relates to information handling systems, and more particularly relates to authenticating work order requests.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An endpoint node of a multiple node environment includes a storage and a processor. The storage may store a public key for an owner of the endpoint node and a hash list. The processor may receive, from a requestor node, a request including a work order for an operation to be performed in the endpoint node. In response to reception of the request, the processor may determine whether the requestor node is authorized to provide the work order for the operation to be performed. In response to the requestor node not being authorized, the processor may provide a prove authentication request. The processor further may receive the requested authorization data. Based on the request authorization data, the processor may perform the operation in the work order of the request.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
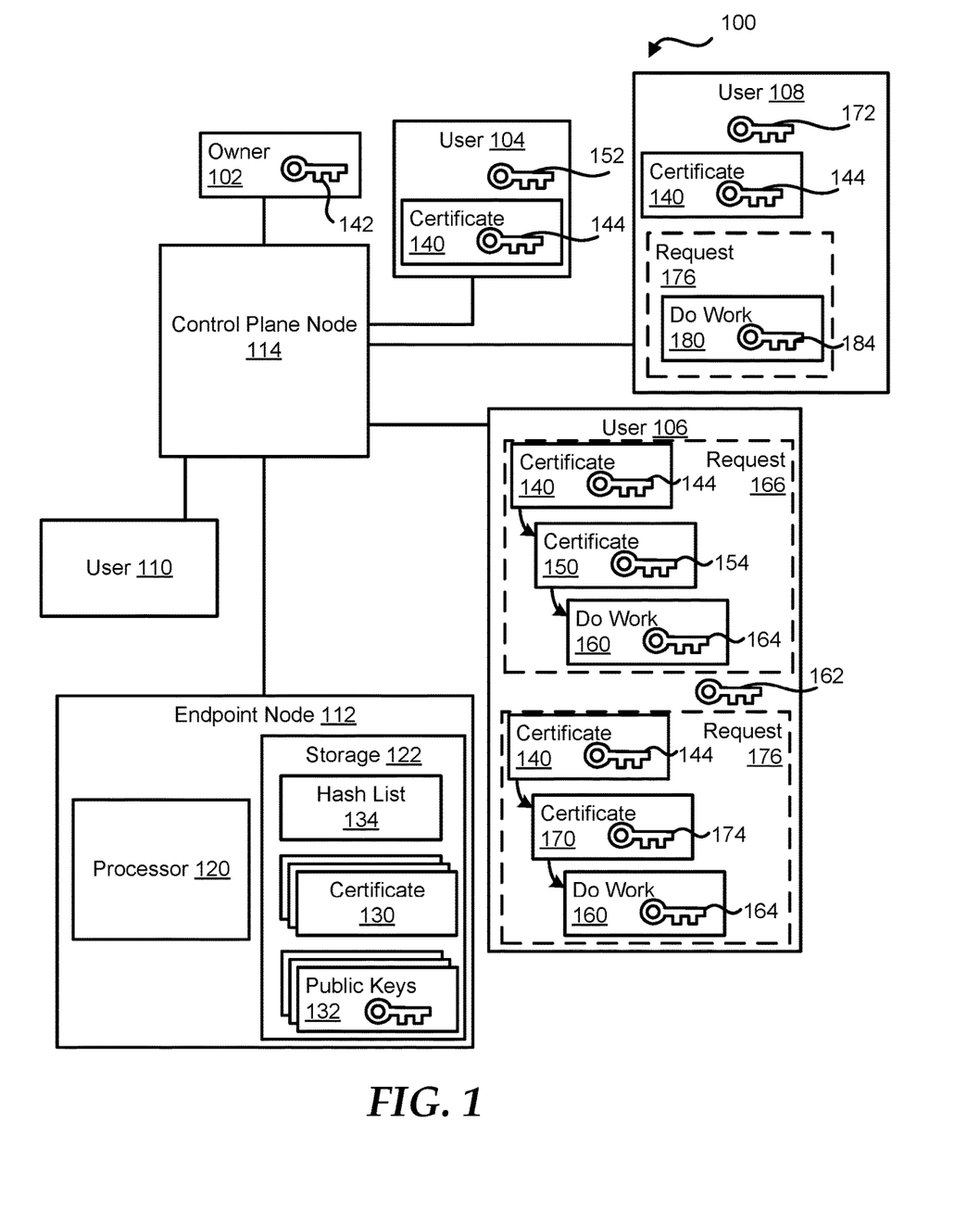
FIG. 1 is a block diagram of a multiple node environment according to at least one embodiment of the present disclosure.

FIG. 1 illustrates a multiple node environment 100 according to at least one embodiment of the present disclosure. Multiple node environment 100 includes an owner node 102, user nodes 104, 106, 108, and 110, an endpoint node 112, and a control plane 114. In an example, owner node 102 and user nodes 104, 106, 108, and 110 may access endpoint node 112 through control plane 114. In certain examples, each user node 104, 106, 108, and 110 may include a processor and a memory. Endpoint node 112 may include a processor 120 and a storage 122. Control plane 114 may include any suitable type of control-plane, such as a global control plane node, regional control plane node, and local control plane node. In an example, global CP nodes, regional CP nodes, local CP nodes, and user nodes 104 and 106 and endpoint node 112 may be any suitable information handling system, such as substantially similar to information handling system 300 of FIG. 3, wherein each node may include a storage and a processor as described below with respect to FIG. 3. Multiple node environment 100 may include any suitable number of additional components or information handling systems without varying from the scope of this disclosure.

In an example, endpoint node 112 may store one or more certificates 130, one or more public keys 132, and a hash list 134 in storage 122. Public keys 132 may be utilized by endpoint node 112 to authenticate any received messages or requests. In certain examples, an owner public key 132 may be hard coded within endpoint node 112 or any other suitable node outside of the control plane of multiple node environment 100. Owner public key 132 may be associated with owner node 102 of endpoint node 112, such as a company, a user, or the like. In an example, security of owner public key 132 may be increased based on the owner public key being stored within a trusted platform module (TPM) of endpoint node 112. Each public key 132 may be associated with different user node, such as user nodes 104 and 106.

In certain examples, owner 102 may perform one or more suitable operations to grant one or more rights or operations to user 104. For example, owner 102 may provide a signed certificate 140 to user 104 via control plane node 114. In an example, certificate 140 may authorize user 104 to request that one or more services or operations be performed in endpoint 110. For example, certificate 140 may authorize user 104 to do anything in endpoint node 112. Certificate 140 may include a key signature 144 that was generated from owner private key 142.

In certain examples, user node 104 may perform one or more suitable operations to grant or delegate one or more rights or operations to user node 106. For example, user node 104 may provide a signed certificate 150 to user node 106 via control plane node 114. In an example, certificate 150 may authorize user 106 to request that one or more services or operations be performed in endpoint 110. For example, certificate 150 may authorize user 106 to do anything in endpoint node 112. Certificate 150 may include a key signature 154 that was generated from user private key 152.

In certain examples, user node 106 may generate a work order 160 that includes a key signature 164 created from user private key 162. As illustrated in FIG. 1, certificate 150 may include a signature derived from certificate 140, which in turn may authenticate user 104 to request any operation identified in certificate 140. Similarly, work order 160 may include a signature derived from certificate 150, which in turn may authenticate user 106 to request any operation identified in certificate 150. In an example, user 106 may generate and provide a request 166 including, but not limited to, an imperative request and a declarative request. Request 166 may include certificates 140 and 150, and work order 160, which in turn may enable endpoint node 112 to authorize or validate the work request 166.

In an example, an imperative request or command may involve a particular action to be performed. For example, an imperative request may be for a memory in an endpoint, such as endpoint 110, to be locked. In response to the imperative request, the endpoint may lock the designated memory. Subsequently, another request may be received to unlock the memory at which point the memory may be unlocked and the imperative request may no longer have any effect.

In an example, a declarative request or command may involve an action to be performed for an extended amount of time. For example, a declarative request may indicate that a memory should be locked. In response to the declarative request, the endpoint may lock the designated memory. Subsequently, another request may be received to unlock the memory at which point the memory may be unlocked. In an example, the declarative request may be different than an imperative request based on the declarative request still being implemented after the subsequent request was performed. For example, if the declarative request is for the memory to be locked and a subsequent request unlocks the memory, the declarative request may cause the memory to be locked again after the subsequent request is no longer being performed. In certain examples, a component, such as a memory, in an endpoint node may have a default state, a declarative request may cause the endpoint to place the component in a declarative state, and an invalidate request may end the declarative request or state so that the component is placed back in the default state.

In certain examples, multiple node environment 100 may be a communications-constrained environment. In an example, communications-constrained systems may include, but are not limited to, systems with limited or slow network connectivity, systems using non-traditional radios, and even non-traditional media. In these systems, exchanges of longer pieces of information can impose a great tax on communications. In an example, a high bandwidth usage of communications-constrained system is even more of a concern in cases where the intended resultant payload of an interaction is quite small. For example, the work order 160 may include infrequent reporting of collected sensor data. In this situation, the data may be as small as one bit, such as a sensor is tripped or not tripped. However, a communications protocol, such as HTTP, may impose much more overhead, such as many bytes for a simple HTTP request. In this situation, the certificate exchange may be many kilobytes. In an example, the extra data size may impose significant and unnecessary overhead burdens on multiple node environment 100 when the environment is something like a longer-distance packetized radio network or WAN.

In an example, cryptographic chains, such as the chain from certificate 140, to certificate 150, and to work order 160, may be used to attest the credentials and authorization of user node 106 to make a request, such as in a certificate-chain-based permissions model. In this situation, a request may be small, but the certificate chain required conveying permissions to do such an operation may be significantly longer.

In some security models, trust may be conveyed from one party or node to another by means of a chain of certificates. In an example, the chain of certificates may be a manner by which each entity in the chain is attested by another, until finally reaching a pre-established trusted entity, such as a 'root' node or owner. In certain examples, the chain of certificates may be created by enrolling one or more root certificate authorities onto multiple node environment 100. When one entity, such as a web server, presents its credentials via a certificate to an endpoint node, the entity may present the parent credentials of the node that authorized the entity via an intermediate certificate along with it. In an example, the length of certificates may vary, based the metadata, the size of the keys used, and the number of entities in the certificate chain. Furthermore, these certificate chains may be re-presented upon every connection. Endpoint node 112 and multiple node environment 100 may both be improved by limiting which credentials, such as certificates or hashes, are needed to be transmitted to only those that are not already known by the endpoint.

In an example, owner node 102 may be the root authority for endpoint node 112. User node 106 may send request 166 to endpoint 110. For this request to be fully attested, user node 106 would have to include two more assertions or certificates, certificate 140 stating owner node 102 gives permission to user node 104 to do anything, and certificate 150 which states that user node 104 permits user node 106 to perform a particular operation in endpoint node 112. Therefore, endpoint 110 may be able to prove that user node 106 was authorized by user node 104 who was authorized by owner node 102 who is the root-of-authority, therefore this request is attested. In certain examples, user node 106 may be a server, user node 104 may be an intermediate certificate authority server, and owner node 102 may be a root certificate authority server. As stated above, transmission of the certificates may be a large amount of data, which may cause a burden on communications within multiple node environment 100.

In certain examples, user node 106 may reduce or eliminate overhead in a constrained communications environment by initially sending request 166 without any certificates. In these examples, endpoint node 112 may have already established owner node 102 as the root-of-trust. In an example, owner node 110 may be established as the root-of-trust for endpoint node 112 in any suitable manner including, but not limited to, a public key 132 for owner node 102 having been hardcoded into endpoint node 112 during the build process. However, endpoint node 112 would need to have already determined or authorized user node 106 before the endpoint node will execute operations included within request 166. In an example, endpoint node 112 may have one or more hashes in hash list 134 or certificates 130 stored in storage 122 to know that user node 106 is authorized to request operations be performed. For example, endpoint node 112 may have previously received, and stored, certificates 140 and 150 to provide a chain of certificates to attest that user node 106 is authorized for particular operations.

In an example, if endpoint node 112 does not have any hashes in hash list 134 or certificates 130 to attest to the authorization of user node 106, endpoint node 112 may provide a prove authorization request to user node 106. In certain examples, the prove authorization request may be for all certificates need for the complete chain of certificates from the root-of-trust service, such as owner node 102, to the server that sent request 166, such as user node 106. While the prove authorization request will be described as being sent to the originator of request 166, such as user node 106, the prove authorization request may be sent to any other node, such as user node 104 or owner node 102, that has the necessary certificates or hashes that are cryptographically attestable to prove authorization of user node 106.

In response to the reception of the prove authorization request, user node 106 may determine which certificates may be required to form a properly attested rule-chain of certificates from owner node 102 all the way to user node 106. User node 106 compile the certificates, such as certificates 140 and 150, that may attest to the authority of user node 106 to have the operation in work order 160 be performed in endpoint 110. User node 106 may then provide the compiled certificates to endpoint node 112.

In an example, after endpoint node 112 has received certificates 140 and 150, processor 120 may utilize the certificates to verify or authenticate work order 160 in request 166. Based on work order 160 and request 166 being verified, processor 120 may perform or execute the operation in the request. In an example, endpoint node 112 may store certificates 140 and 150 in the group of certificates 130 within storage 122. Based on certificates 140 and 150 being stored in storage 122, endpoint node 112 may be able to utilize the stored certificates to authenticate a repeat of request 166 from user node 106. As used herein, a repeat of request 166 may be a subsequent request associated with the only the same operations as request 166. In an example, the storage of certificates 140 and 150 may improve communication bandwidths within multiple node environment 100 because original request 166 and repeated requests do not need to have all of the certificates transmitted with the request.

In certain examples, while not providing the chain of certificates with request 166 reduces bandwidth when endpoint node 112 has all needed certificates, transmission time increases, and the bandwidth does not reduce when the endpoint does not have all the needed certificates. For example, if there is any inability for endpoint node 112 to fully attest an operation in request 166, a re-query is submitted such that user node 106 must return all the data in the complete certificate chain. Thus, when endpoint node 112 does not already have all the certificates, the provided authenticate request may be less efficient than to simply have user node 106 to send certificates 140 and 150 in the request 166.

In an example, certificates 140 and 150 may be identified by a unique identifier, such as a cryptographic hash. Based on the use of a cryptographic hash, a size of data provided based on the prove authentication request may be minimized because user node 106 may only return hash values rather than entire certificates. Additionally, cryptographic hashes of certificates may enable endpoint node 112 to have a reliable mechanism by which the endpoint may equate returned hash values to certificates 130 which are already known or stored in storage 122 of the endpoint. The use of cryptographic hashes may also enable endpoint node 112 to explicitly ask user node 106 only for certificates which it does not already have.

As stated above, owner node 102 may be the known root-of-trust for endpoint node 112. User node 106 may send request 166 to endpoint node 112 with work order 160 to have processor 120 perform an operation and the request may be signed user private key 162 of user node 106. However, endpoint node 112 may not have a certificate or hash to identify or authenticate user node 106 as an entity to provide request 166 to enable the endpoint node to perform the operation identified in the request. In response to the proper certificates or hashes not being stored in storage 122, endpoint node 112 may provide a prove authorization request to user node 106. In an example, the prove authentication request may want proof that user node 106 is authorized by owner node 102 to have endpoint node 112 perform the operation in work order 160 of request 166.

In response to the prove authentication request, user node 106 may search a storage within the user node and find a certificate hash associated with certificate 140 and a certificate hash associated with certificate 150. User node 106 may determine that these two certificate hashes may prove the authentication for user node 106 and provide the identifiers for these hashes to endpoint node 112. In an example, processor 120 may determine that the hash identifiers received from user node 106 are not within hash list 134, such that the authorization for user node 106 cannot be verified. Endpoint node 112 may provide user node 106 with a new request for the certificates associated with the hash identifiers. User node 106 may then provide certificates 140 and 150 to endpoint node 112. In response to the reception of certificates 140 and 150, processor 120 of endpoint node 112 may attest that user node 106 is authorized to perform the operation in work order 160 of request 166 so that the operation is permitted and performed.

In an example, user node 104 may provide user node 108 with a certificate 170 send with signature 174 generated from user key 152. Certificate 170 may authorize user node 108 to perform the same operation as granted to user node 106 via certificate 150. Based on certificate 170, user node 108 may send a request 176 to endpoint node 112 with a work order 180 to have processor 120 perform an operation and the request may include a signature 184 generated from user private key 182 of user node 108. However, endpoint node 112 may not have a certificate or hash to identify or authenticate user node 108 as an entity to provide request 176 to enable the endpoint node to perform the operation identified in the request. In response to the proper certificates or hashes not being stored in storage 122, endpoint node 112 may provide a prove authorization request to user node 108. In an example, the prove authentication request may want proof that user node 108 is authorized by owner node 102 to have endpoint node 112 perform the operation in work order 180 of request 176.

In response to the prove authentication request, user node 108 may search a storage within the user node and find a certificate hash associated with certificate 140 and a certificate hash associated with certificate 170. User node 108 may determine that these two certificate hashes may prove the authentication for user node 108 and provide the identifiers for these hashes to endpoint node 112. In an example, processor 120 may determine that the hash identifiers for certificate 140 is in hash list 134 but that the certificate hash for certificate 170 is not in the hash list, such that the authorization for user node 108 cannot be verified. Endpoint node 112 may provide user node 1089 with a new request for certificate 170. User node 106 may then provide certificate 170 to endpoint node 112. In response to the reception of certificate 170, processor 120 of endpoint node 112 may attest that user node 108 is authorized to perform the operation in work order 180 of request 176 so that the operation is permitted and performed.

In an example, endpoint node 112 already had the certificate hash for certificate 140, such that only certificate 170 was needed to be sent to endpoint 110. In this example, as chain of certificates get longer, only the unknown certificates need to be transmitted to endpoint node 112 so that bandwidth consumed by certificate transmission on multiple node environment 100 is reduced. In certain examples, if certificate 140 or 150 is revoked, processor 120 of endpoint node 112 may remove this certificate and the associated hash from storage 122. In this situation, user nodes would no longer be able to utilize revoked certificates to have operations performed in endpoint node 112.

In certain examples, user node 104 may no longer have permission by owner node 102 to perform operations at endpoint node 112. In this situation, hashes associated with certificates 140 and 150 along with the certificates themselves may be deleted from storage 122. However, owner 102 may authorize user node 110 to perform the operations previous provided to user node 104, and user node 110 may provide a signed certificate granting user node 106 with the same permissions as certificate 150. When user node 106 provides request 166 to endpoint node 112, processor 120 may determine that certificates 140 and 150 are not in storage 122 and provide a prove authentication request to user node 106.

In response to the provide authentication request, user node 106 may provide certificates hashes for the certificate from owner node 102 granting permissions to user node 110 and the certificate from user node 110 granting permission to user node 106. User node may provide these hashes to endpoint node 112 as proof of authentication. In an example, processor 120 may determine that the hash identifiers received from user node 110 are not within hash list 134, such that the authorization for user node 110 cannot be verified. Endpoint node 112 may provide user node 110 with a new request for the certificates associated with the hash identifiers. User node 110 may then provide these certificates to endpoint node 112. In response to the reception of these new certificates, processor 120 of endpoint node 112 may attest that user node 110 is authorized to perform the operation so that the operation is permitted and performed.

In certain examples, user nodes may provide certificates to endpoint node 112 in any suitable manner including, but not limited to, provide all attested certificates along with the original request, provide no certificates with the original request and wait for endpoint node 112 to ask for all the certificates, and provide no certificates with the original request and wait for endpoint node 112 to ask for particular certificates. In an example, a user node, such as user nodes 104, 106, 108 and 110, may determine whether to provide certificates with the request based on how the certificates are stored or sent. For example, if the certificates are sent to the user node via an electronic mail message, copied from a USB key, or the like, the user node may determine to send all certificates with the original request. In an example, if the user node has a list of certificates previously provided to endpoint node 112, the user node may determine which certificate are needed and proactively send only the certificates that have not been previously shared in the original request.

Figure 2:
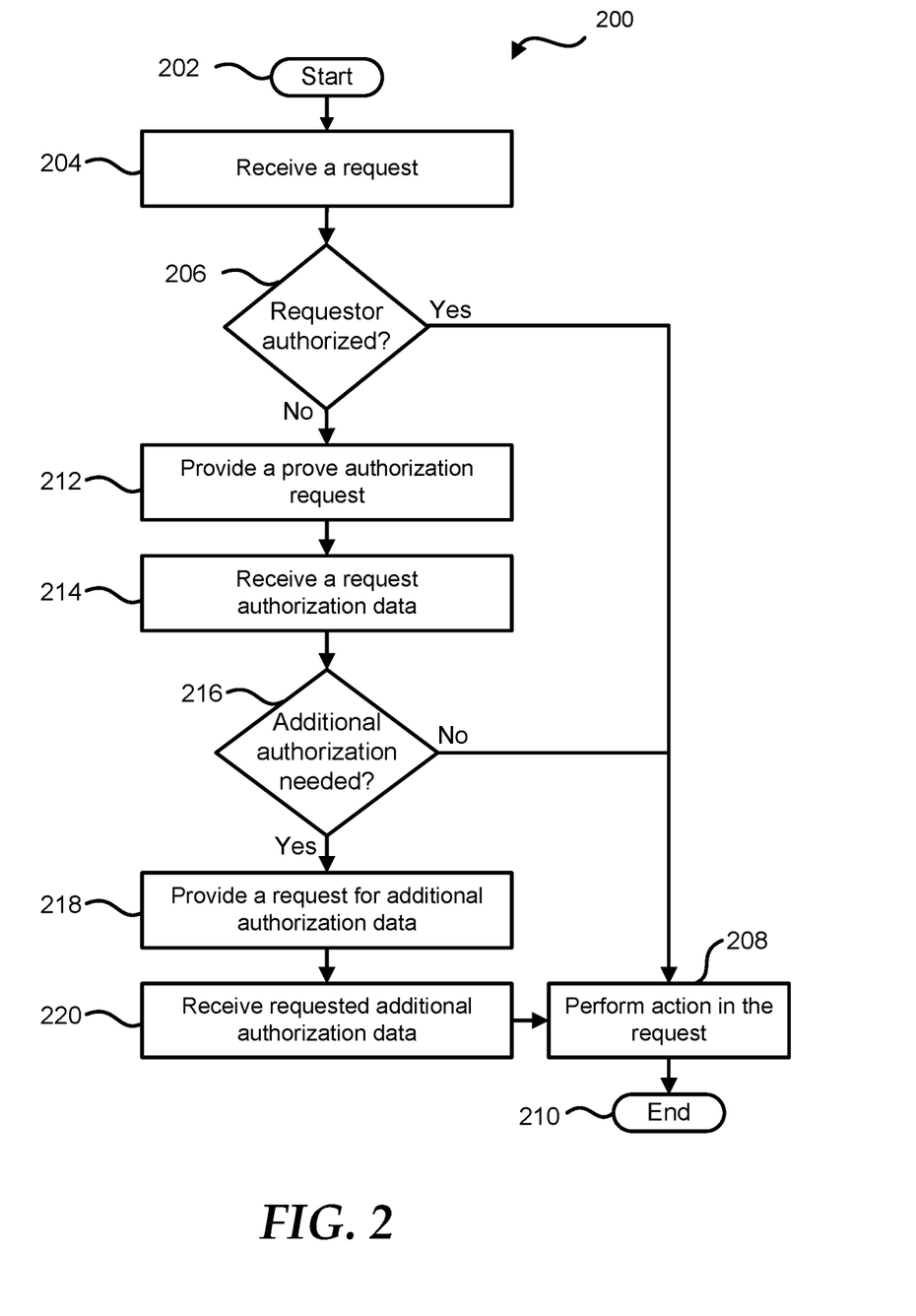
FIG. 2 is a flow diagram of a method for authenticating work order requests in a multiple node environment according to at least one embodiment of the present disclosure.

FIG. 2 illustrates a flow of a method 200 for authenticating work order requests in a multiple node environment according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure.

At block 204, a request is received at an endpoint node of a multiple node environment. In an example, the request may include a work order indicating or more operations to be performed in the endpoint node. In certain examples, the request may also include one or more authentication certificates or hashes to attest that the requestor node has permission to request the operations to be performed in the endpoint node.

At block 206, a determination is made whether the requestor node is authorized to request the operations to be performed in the endpoint. In an example, the determination may include analyzing the certificates or hashes, if any, included within the request, certificates or hashes stored in a storage of the endpoint node, or the like. In certain examples, the determination includes determining whether a chain of certificates exists from the root-of-trust node to the requestor node granting permission for the work order operations. If the requestor node is authorized, the action or operation in the work order of the request is performed at block 208 and the flow ends at block 210.

However, if the request node is not authorized, a prove authorization request is provided at block 212. In certain examples, the prove authorization request may include any suitable data to indicate the certificates needed to determine whether the requestor node has permission from the root-of-trust node. At block 214, requested authorization data is received at block 216. In an example, the requested authorization data may include certificates or hashes granting permissions to the requestor node.

At block 216, a determination is made whether additional authorization is needed. In an example, additional authorization may be required if a certificate in provided requested authorization data is a certificate that has been revoked or the like. If no additional authorization data is needed, the action or operation in the work order of the request is performed at block 208 and the flow ends at block 210.

If additional authorization data is needed, a request for additional authorization data is provided at block 218. At block 220, the additional authorization data is received. At block 208, the action or operation in the work order of the request is performed and the flow ends at block 210.

Figure 3:
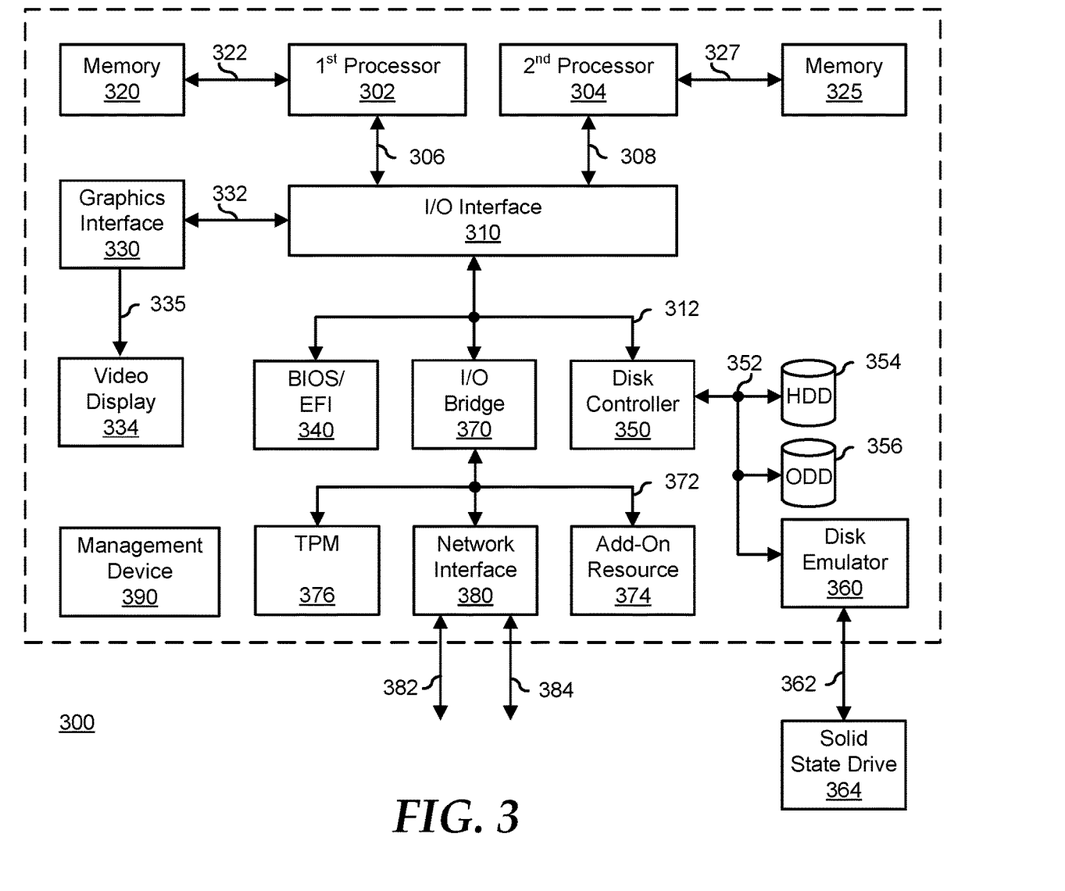
FIG. 3 is a block diagram of a general information handling system according to an embodiment of the present disclosure.

FIG. 3 shows a generalized embodiment of an information handling system 300 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332 and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 3394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312 or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An endpoint node of a multiple node environment, the endpoint node comprising:
   a storage configured to store a public key for an owner of the endpoint node and a hash list; and
   a processor to communicate with the storage, the processor to:
      receive, from a requestor node, a request including a work order for an operation to be performed in the endpoint node;
      in response to reception of the request, the processor to:
         determine whether the requestor node is authorized to provide the work order for the operation to be performed;
         in response to the requestor node not being authorized, provide a prove authentication request;
         receive requested authorization data, wherein the requested authorization data includes a chain of certificates granting permissions from a root-of-trust node to the requestor node; and
         based on the requested authorization data, perform the operation in the work order of the request.

2. The endpoint node of claim 1, wherein the determination of whether the requestor node is authorized to provide the work order for the operation to be performed, the processor further to:
   compare one or more certificate hashes in the request to the hash list stored in the storage; and
   in response to the one or more certificate hashes not being in the hash list, determine that the requestor node is not authorized.

3. The endpoint node of claim 2, in response to the one or more certificate hashes not being in the hash list, the processor further to: perform the operation in the work order of the request.

4. The endpoint node of claim 1, wherein the chain of certificates includes a first certificate from an owner node granting all permissions to a second node, and a second certificate from the second node granting the requestor node permission to perform the operation in the work order of the request.

5. The endpoint node of claim 1, wherein the processor further to:
   store one or more previously received certificates in the storage; and
   determine whether one or more previously received certificates authorize the requestor node to perform the operation in the work order of the request.

6. The endpoint node of claim 1, wherein the processor further to:
   receive a notification of a revoked certificate; and
   in response to the notification, remove the revoked certificate from the storage.

7. The endpoint node of claim 1, wherein the processor further to:
   receive a notification of a revoked certificate; and
   in response to the notification, remove a certificate hash associated with revoked certificate from the hash list in the storage.

8. The endpoint node of claim 1, wherein the prove authentication request includes an explicit request only for certificates not already in the storage.

9. A method comprising:
   receiving, by a processor of an endpoint node in a multiple node environment, a request including a work order for an operation to be performed in the endpoint node, wherein the request is received from a requestor node;
   in response to reception of the request:
      determining whether the requestor node is authorized to provide the work order for the operation to be performed;
      storing one or more previously received certificates in a storage;
      determining whether one or more previously received certificates authorize the requestor node to perform the operation in the work order of the request;
      in response to the requestor node not being authorized, providing a prove authentication request;
      receiving requested authorization data; and
      based on the requested authorization data, performing the operation in the work order of the request.

10. The method of claim 9, the determining of whether the requestor node is authorized to provide the work order for the operation to be performed, the method further comprises:
   comparing one or more certificate hashes in the request to a hash list stored in the storage; and
   in response to the one or more certificate hashes not being in the hash list, determining that the requestor node is not authorized.

11. The method of claim 10, in response to the one or more certificate hashes not being in the hash list, the method further comprises: performing the operation in the work order of the request.

12. The method of claim 9, wherein the requested authorization data includes a chain of certificates granting permissions from a root-of-trust node to the requestor node.

13. The method of claim 12, wherein the chain of certificates includes a first certificate from an owner node granting all permissions to a second node, and a second certificate from the second node granting the requestor node permission to perform the operation in the work order of the request.

14. The method of claim 9, further comprising:
   receiving a notification of a revoked certificate; and
   in response to the notification, removing the revoked certificate from the storage.

15. The method of claim 9, further comprising:
   receiving a notification of a revoked certificate; and
   in response to the notification, removing a certificate hash associated with revoked certificate from a hash list in the storage.

16. The method of claim 9, wherein the prove authentication request includes an explicit request only for certificates not already in the storage.

17. A method comprising:
   receiving, by a processor of an endpoint node in a multiple node environment, a request including a work order for an operation to be performed in the endpoint node, wherein the request is received from a requestor node;
   in response to reception of the request:
      comparing one or more certificate hashes in the request to a hash list stored in a storage of the endpoint node;
      in response to the one or more certificate hashes not being in the hash list, determining that the requestor node is not authorized to provide the work order for the operation to be performed;
      in response to the requestor node not being authorized, providing a prove authentication request;
      receiving requested authorization data, wherein the requested authorization data includes a chain of certificates granting permissions from a root-of-trust node to the requestor node; and
      based on the requested authorization data, performing the operation in the work order of the request;
   receiving a notification of a revoked certificate; and
   in response to the notification, removing the revoked certificate from the storage.

18. The method of claim 17, wherein the chain of certificates includes a first certificate from an owner node granting all permissions to a second node, and a second certificate from the second node granting the requestor node permission to perform the operation in the work order of the request.

19. The method of claim 17, further comprising:
   receiving a notification of a revoked certificate; and
   in response to the notification, removing a certificate hash associated with revoked certificate from the hash list in the storage.

20. The method of claim 17, wherein the prove authentication request includes an explicit request only for certificates not already in the storage.

* * * * *